US007431623B1

(12) United States Patent
Saucedo et al.

(10) Patent No.: US 7,431,623 B1
(45) Date of Patent: Oct. 7, 2008

(54) MODULAR VERTICAL FLOATING PIPE

(76) Inventors: Eduardo Saucedo, 1075 Pensive La., Great Falls, VA (US) 22066; Raúl Agustin Saucedo, Gob. José Ceballos. #47bis, Depto 7, Col. San Miguel Chapultepec. Ciudad de Mexico, Mexico City, DF (MX) 11850; Francisco Jose Barnes, 2a. Cda. Prolog. Melchor Ocampo No. 20 Casa 23 Col. Pedregal de San Francisco, México, D.F. (MX) 04320

( * ) Notice: Subject to any disclaimer, the term of this patent is extended or adjusted under 35 U.S.C. 154(b) by 0 days.

(21) Appl. No.: 11/079,200

(22) Filed: Mar. 15, 2005

Related U.S. Application Data

(60) Provisional application No. 60/618,607, filed on Oct. 15, 2004.

(51) Int. Cl.
*B63B 22/00* (2006.01)
(52) U.S. Cl. ...................................... 441/133
(58) Field of Classification Search .................. 441/133
See application file for complete search history.

(56) References Cited

U.S. PATENT DOCUMENTS 4,656,962 A * 4/1987 Hale .......................... 114/264
5,582,440 A * 12/1996 Pascaru ....................... 285/373
6,155,748 A * 12/2000 Allen et al. ............... 405/195.1

* cited by examiner

*Primary Examiner*—Stephen Avila

(57) ABSTRACT

Modular vertical floating pipe comprising a plurality of modules, each module formed by (a) two pipe segments of slightly different diameter, the lower segment with the smaller diameter segment joined by a collar with the upper pipe segment and (b) an annular floater of such dimensions that could slide up only in the lower vertical segment. A longer pipe would be formed by inserting one module on top of another, and repeating the operation until all modules have been utilized. The additional weight of a new module will be pushing the section of the pipe already formed down. The difference in diameter between the upper and lower segments will allow the pipe to bend with undersea currents. Appropriate seals will dampen the bending movements and cabling supporting a weight attached to cabling guides will prevent disengagement of the modules. By tying the cable to the top floater, the long pipe could be lowered and disconnected from the platform, allowing the platform and the pipe to ride a threatening storm independently.

3 Claims, 11 Drawing Sheets

MODULAR VERTICAL FLOATING PIPE

CROSS-REFERENCE TO RELATED APPLICATIONS

On Oct. 15, 2004, I submitted a Provisional patent application (PPA), and received confirmation number 3933 for Application No. 60/618,607 which was mailed on Nov. 16, 2004. The following patent application refers to one of the inventions therein presented.

FEDERALLY SPONSORED RESEARCH

Not Applicable

SEQUENCE LISTING OR PROGRAM

Not Applicable

BACKGROUND OF THE INVENTION

The present invention relates to the Ocean Thermal Energy Conversion ("OTEC") system and more particularly to the Cold Water Pipe ("CWP") for such system. Since the present invention is also applicable to the Surface Water Pipe ("SWP") and the Discharge Water Pipe ("DWP"), if needed for the system, the three pipes will be herein called individually the Ocean Thermal Energy Conversion Water Pipe ("OTECWP") or, if reference is made to more than one, as Ocean Thermal Energy Conversion Water Pipes ("OTECWPs"). OTEC systems are energy (and fresh water) producing systems that exploit the temperature difference between warm surface waters in tropical seas and the cold waters in deeper ocean strata. Typically an OTEC system would include a plant mounted on a platform, a ship or barge and a large diameter CWP. Cold water at depths of about 1,000 m is pumped to the surface thorough the CWP, directing the cold water into a power module. The power module also receives warm water from the surface. The temperature differential between the cold water and the warm water is then exploited in the generation of electric energy through well known OTEC techniques.

A conventional Closed Cycle OTEC system will be discussed in detail. A working fluid, which is contained within the closed cycle, is pumped by a liquid pump into an evaporator, where heat from a warm water intake is transferred from the warm water to the working fluid to generate a working fluid vapor. The warm water exiting the evaporator is discharged to the sea. The working fluid vapor enters a turbo-generator to generate electricity by conventional techniques. The working fluid vapor exits the turbo-generator and is condensed in a condenser utilizing cold sea water as a heat sink. The condensed working fluid is then fed back to the liquid pump in order to complete the closed system. Additional information of the OTEC technology can be found in "Renewable Energy from the Ocean—A Guide to OTEC" by Avery and Wu—Oxford University Press—1994.

Water temperature at depths of about 1,000 m is about 4° C., while surface water in the tropics is about 25-28° C. The energy available from such small temperature difference is little, requiring moving large quantities of both deep and surface water. As an illustration, to produce a meaningful amount of electricity (100 MWhr), a typical OTEC system will require about 300 $m^3$/s of both cold and surface water. To bring that amount of cold water would require a Cold Water Pipe ("CWP") about 1,000 m long and 15-18 m in diameter. Other variations of the OTEC system, namely the Open Cycle and the Hybrid Cycle would also require similar sized CWP.

The length, diameter and weight of the CWP represent a major challenge. The wave induced heave, roll and pitch of the floating platform will be transmitted to the CWP. The connection of the CWP with the floating platform must be sufficiently flexible to withstand such erratic movements or the platform, the connection or the CWP could be damaged.

The heavier the CWP is, the stronger the support needs to be, and yet it has to provide flexibility to accommodate the pitch, roll and heave produced by the seas. Since both the platform and the CWP are massive structures, the connection needs to be: (i) flexible enough to react to the sea movements, and; (ii) strong enough to accommodate the stress caused by the movement of a moving platform against the inertia of the CWP.

A typical OTEC plant might require, in addition to the CWP, a discharge water pipe (the "DWP") to discharge the spent cold and surface water at sufficient depth to avoid mixing with warm surface water. Mixing the warm and cold water discharges would require a DWP of about 80 m (the final length will depend on the relative flow rates of cold and surface water and the depth/water temperature profile at the selected site). There are many alternative ways of collecting surface water, but it might also be convenient to provide for a surface water pipe ("SWP"), especially if providing for such structure could provide some protection to the CWP. Although the length and weight of the DWP and SWP will be smaller than those of the CWP, they are still massive structures providing similar challenges as the CWP. The diameter of the SWP would be similar to the diameter of the CWP (15-18 m), while the DWP would be about 1.5 times the diameter of either the CWP or SWP.

PRIOR ART

The off-shore oil and gas industry utilizes, for shallower waters, fixed platforms above the ocean surface with legs extending to the bottom of the sea to provide stability. This approach is not applicable for an OTEC system for two reasons: (i) OTEC systems operate in much deeper waters, and; (ii) the high energy required to pump both surface and cold waters to the platform above sea level (some of the energy might be recovered by means of water turbines in the discharge). For deeper waters, the oil and gas industry has used semi-submersible platforms (with or without tensioned legs), but those platforms do not include a massive CWP (a gas/oil application requires pipe diameters of a few dozen inches, while an OTEC plant might require a few dozen meters).

Several engineering studies of alternative concepts for CWP-platform joints that would be suitable for CWP diameters of 10 m or more were conducted under NOAA/DOE sponsorship in the late 1970s, which resulted in several patents applications.

U.S. Pat. No. 4,116,009 to Daubin (1978) proposed a compliant pipe made out of fiber reinforced elastomers with chambers filled with a lighter than water fluid to provide buoyancy adjusted with flap valves together with a pumping system mounted at the bottom end of the compliant pipe. There are four problems with the idea: (i) the flap valves are unlikely to resist the high pressure in deep waters (the pressure increases linearly with depth, and at the bottom portion of a 1,000 m CWP, the pressure will be 100 atms) and the chambers are likely to be filled with water; (ii) the fibers along the longitudinal axis would have to support the heavy weight of the pumping system and the weight of the pipe; (iii) construction and deployment of a single compliant pipe has complications not addressed in the patent, and; (iv) in the event of failure, the OTEC plant might be idle for months while a new pipe is constructed.

U.S. Pat. No. 4,281,614 to McNary (1981) proposed a gimbal and ball suspension and coupling mechanism to support an arrangement of three polyethylene pipes 4 feet in diameter and a wall thickness of about 2 inches of great length. There are two main problems with the idea: (i) a 100 MW plant would require about 50 of such modules, and; (ii) given the number of modules and the thickness of the walls, the amount of polyethylene required will result in an expensive solution.

U.S. Pat. No. 4,293,239 to Petty (1981) proposed a method for building a large diameter column made from a plurality of buoyant columnar members submerged and anchored with weights and the OTEC platform connected with a pivotable joint. There are two problems with the idea: (i) the massive OTEC platform would have to be firmly anchored with tensioned legs above the column, prevented to move past the point of connection with the pivotable joint, and will be producing large stress on the pivotable joint by the continuous heave, roll and pitch produced by the waves, and; (ii) the thickness of the material to provide buoyancy and yet resist the pressures of deep water is not discussed in the patent.

U.S. Pat. No. 5,024,557 to Iorns (1991) proposed a method and apparatus for constructing an offshore hollow concrete column. Since concrete is not totally impermeable to high pressure water, this patent also has the problem of thickness of the concrete to prevent water entering the void spaces in deep water.

Finally, there are two thin film patents. U.S. Pat. No. 4,176,863 to Wetmore (1979) proposed a thin film pipe supported by elements hanging from outside rings or internal supports from a central tensile core. The main problem with this idea is the complicated assembly having to connect thousands of wires to provide the needed support of the modules hanging from the central tensile core. U.S. Pat. No. 4,497,342 to Wenzel (1985) proposed a retractable flexible cold water pipe with a pump at the bottom of the pipe. Although maybe easier to repair than Daubin's idea, because of its retract-ability, it is a single unit and the pump at the bottom of the pipe is unnecessary.

Since there are other means of collecting surface waters, the lack of reference in the literature of the SWP is understandable. The omission of similar references for the DWP, which presents similar challenges as the CWP, reflects a consensus that the solution to the CWP could be scaled to the DWP.

OBJECTS AND ADVANTAGES

One object of the present invention is to provide an improved ocean thermal energy conversion ("OTEC") system.

It is a further object of the present invention to provide for modular vertical floating pipes that could be used indistinctively for any one of the OTECWPs, namely the CWP, the SWP and the DWP.

It is a further object of the present invention to provide for a light, flexible and stable OTECWP to remain operational even in rough seas.

It is a further object of the present invention to provide for modular floaters to be attached to individual segments of the OTECWP.

It is a further object of the present invention to construct the individual modules or segments of an OTECWP utilizing simple and proven construction techniques, allowing for mass production of the modules and the floaters, thus simplifying construction of the OTECWP.

It is a further object of the present invention to provide for a simplified form of assembling the different OTECWPs at the site.

It is a further object of the present invention to provide for a mechanism to allow regulating the buoyancy of the individual modules, allowing water in and out of the floaters by means of a set of valves and pumps/compressors.

It is a further object of the present invention to provide for cabling guides along the floaters connected to an anchor at the bottom of each OTECWP to maintain the long pipe vertically and assure that sea currents do not push the OTECWP past the contact point of the modules, separating the modules.

It is a further object of the present invention to allow the lowering and rising of the OTECWPs, decoupling if necessary, in threatening extreme sea conditions, and leaving them submerged at the desired depth while the threat of the storm subsides.

It is a further object of the present invention to provide for protection of the CWP by using a concentric arrangement, whereby either a stronger and shorter DWP or a concentric arrangement of SWP and DWP, will dampen movements to the much longer CWP.

It is a further object of the present invention to provide for a modular and flexible design for OTECWPs system, providing multiple units which will allow replacing modules easily in the event one of them is damaged, improving reliability and simplifying maintenance and repairs.

The main advantages of the preferred embodiment are its light weight, its modular construction and its flexibility.

SUMMARY OF THE INVENTION

The present invention provides for a practical and economical way of constructing the OTECWPs by utilizing a modular approach, creating a vertical pipe with annular floaters that is light, flexible and stable even in rough seas. A plurality of modules could be constructed in a dry dock of a ship yard and with the aid of floaters could be floated and towed to the site where they would be assembled by inserting one module on top of another, until reaching the desired depth, with the weight of the upper module pushing the lower modules down. The buoyancy of the floaters of each module could be controlled by injecting water or air as needed. Cabling guides supporting a weight would maintain the pipe vertical and would prevent disengagement of the modules if pushed by undersea currents. These and other objects of the present invention will become more readily apparent from the detailed description given hereafter. However, it should be understood that a detailed description and specific Examples, while indicating preferred embodiments of the inventions, are given by way of illustration only, since various changes and modifications within the spirit and scope of the inventions will become apparent to those skilled in the art, from this description.

BRIEF DESCRIPTION OF THE DRAWINGS

The present invention will become more fully understood from the detailed description and the accompanying drawings given herein below, which are given by way of illustration only and thus are not limitative of the present invention.

Figure 1:
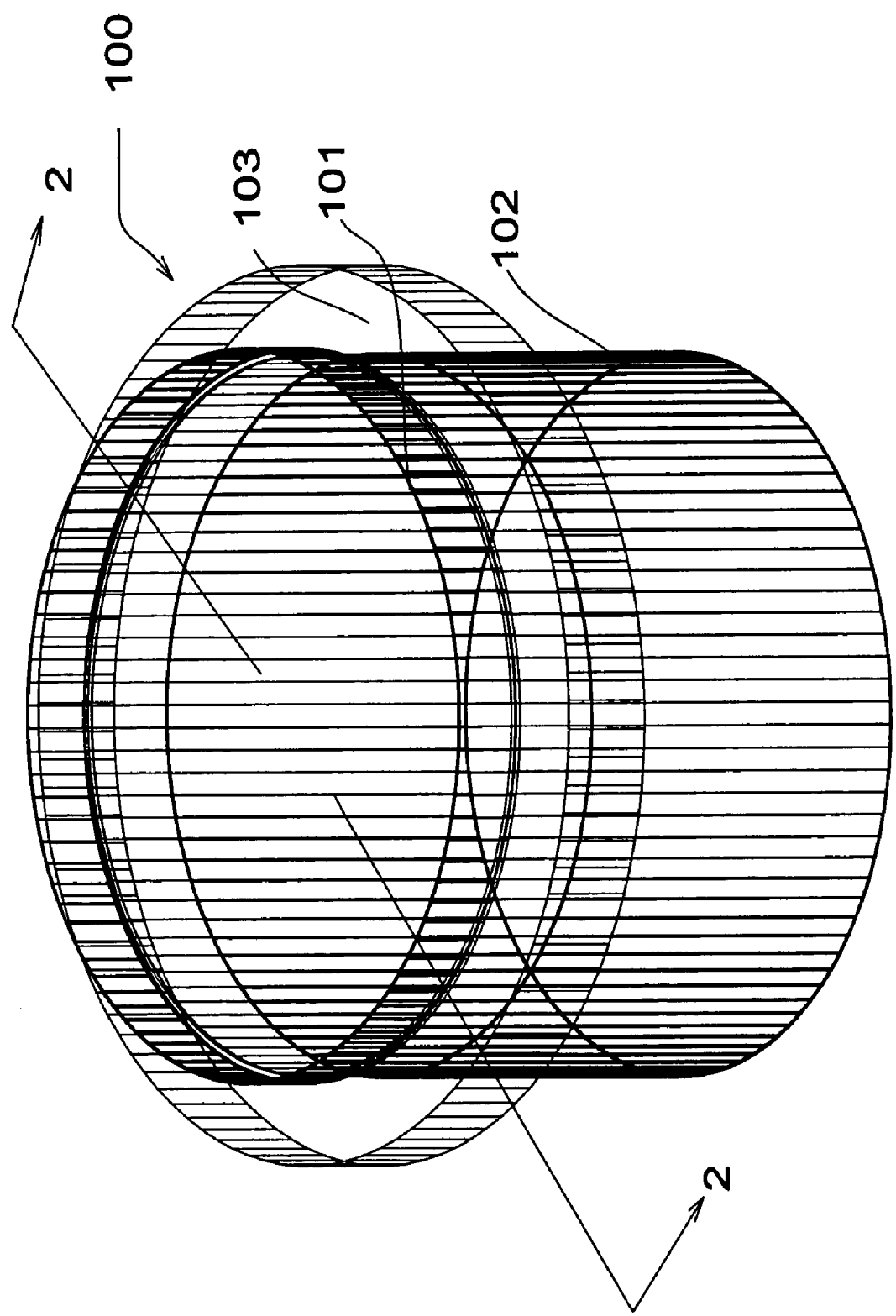
FIG. 1 illustrates an isometric view of the preferred embodiment of one module of the modular vertical floating OTECWP with a floater.

REFERENCE NUMERALS 100 preferred embodiment
101 upper pipe segment
102 lower pipe segment
103 annular floater
104 large type "O" ring seal
105 conical seal
106 collar formed at intersection of two pipe segments
107 cable guide hook
100a alternative embodiment
101a upper pipe segment for alternative embodiment
105a conical seal for alternative embodiment
112 support cable for weight or anchor
115 weight or anchor
116 screen
117 reinforcing bottom ring
201 upper pipe segment of smaller OTECWP
202 floater for smaller OTECWP
203 lower pipe segment of smaller OTECWP
204 upper pipe segment of larger OTECWP
205 floater for larger OTECWP
206 lower pipe segment of larger OTECWP

DETAILED DESCRIPTION OF THE PREFERRED EMBODIMENT

The improvement of either one of the OTECWPs for an OTEC system, in the preferred embodiment, is illustrated in FIGS. 1 to 7.

FIG. 1(a) shows an isometric view of a fully assembled module 100 of the preferred embodiment, assuming it is floating in the water, showing its three main parts: an upper pipe segment 101, a lower pipe segment 102, longer than the upper pipe segment and of a slightly smaller diameter, and an annular floater 103 of similar internal diameter as the outer diameter of the lower vertical pipe segment, restrained at that level by the collar (not shown) formed between the lower and upper pipe segments. Although the pipe segments are shown to be circular, they could be elliptic, oval or any other shape.

The OTECWP modular pipe segments could be constructed in a suitable dry dock in a ship yard, utilizing common construction techniques. The OTECWP modular pipe segments could be made out of concrete, steel or another suitable material that could be shaped as desired and capable of many years of operation in the marine environment. Except for the size of the dry dock there is no limitation on the diameter of the OTECWP to be constructed. Once one module has been constructed and the floater 103 has been assembled in the form of a doughnut around the lower portion of vertical lower segment, water will be allowed to enter the dry dock. As the water level rises, the annular floater 103 will slide up the lower vertical segment 102 until it reaches the collar (not shown), at which point the floater will start floating the OTECWP module. Once the module is floating, it could be towed and tied to a buoy outside the dry dock. The maximum height attainable would be limited only by the depth of the dry dock, if it is desirable to float it in the vertical position. However, the present invention is not limited to a vertical construction. The module could be constructed horizontally, floated with an auxiliary floater in the lower portion which would be removed afterwards in an area with sufficient depth. The process will be repeated until all the necessary modules have been constructed.

The annular floaters 103 will be constructed out of steel, either welded as a single piece, or welding together several segments in situ, around the lower portion of the OTECWP module. It might be possible to construct the upper floaters (those close to the surface) for all OTECWP out of concrete, but lower segments will have to be constructed out of steel, since concrete is not totally impermeable. As the external pressure increases linearly with the depth, the thickness of the steel used to produce the floaters will have to be increased for lower segments or the floaters will have to be constructed with additional reinforcements or a combination of the two factors, since at the depth of 1000 m the pressure is about 100 atms. The displacement volume of the floater would be predetermined taking into consideration the weight of the material to construct the floater and the weight of the segment that the floater will be supporting.

Figure 2:
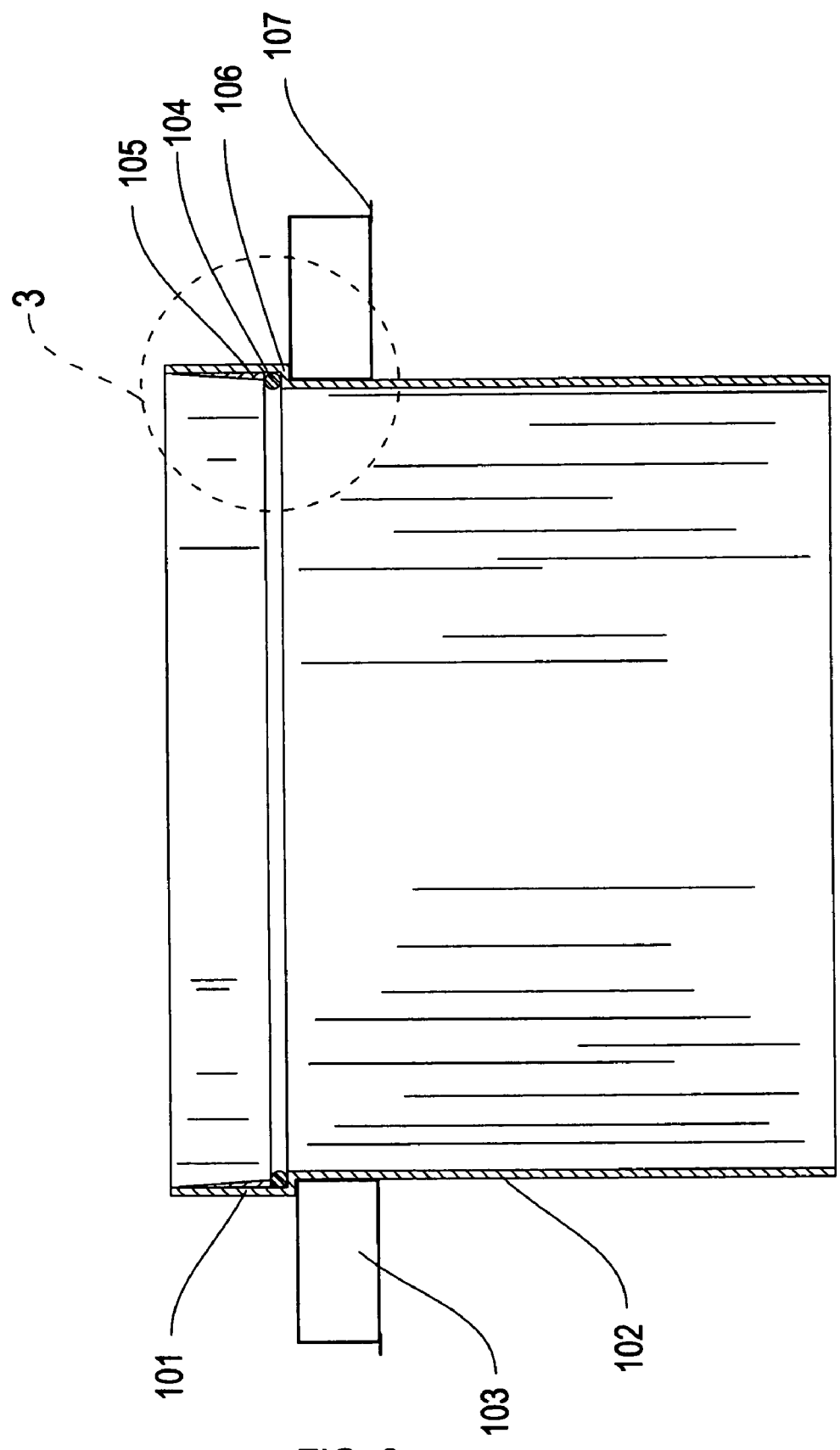
FIG. 2 illustrates a cross sectional view of the preferred embodiment taken along lines 2-2 of FIG. 1.
Figure 3:
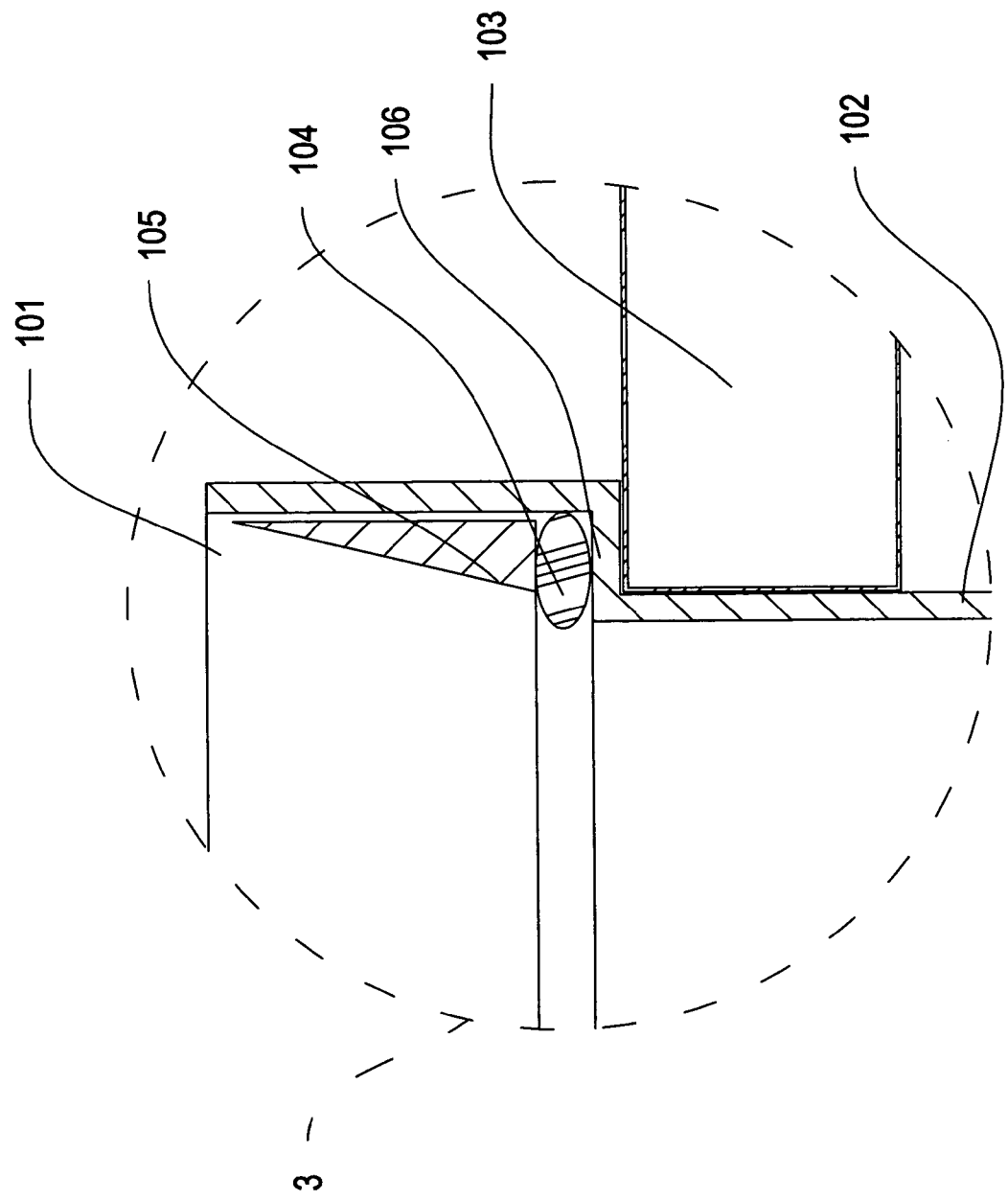
FIG. 3 illustrates a detailed view of the cross section view of one module of the preferred embodiment taken along the dashed lines 3 in FIG. 2.
Figure 4:
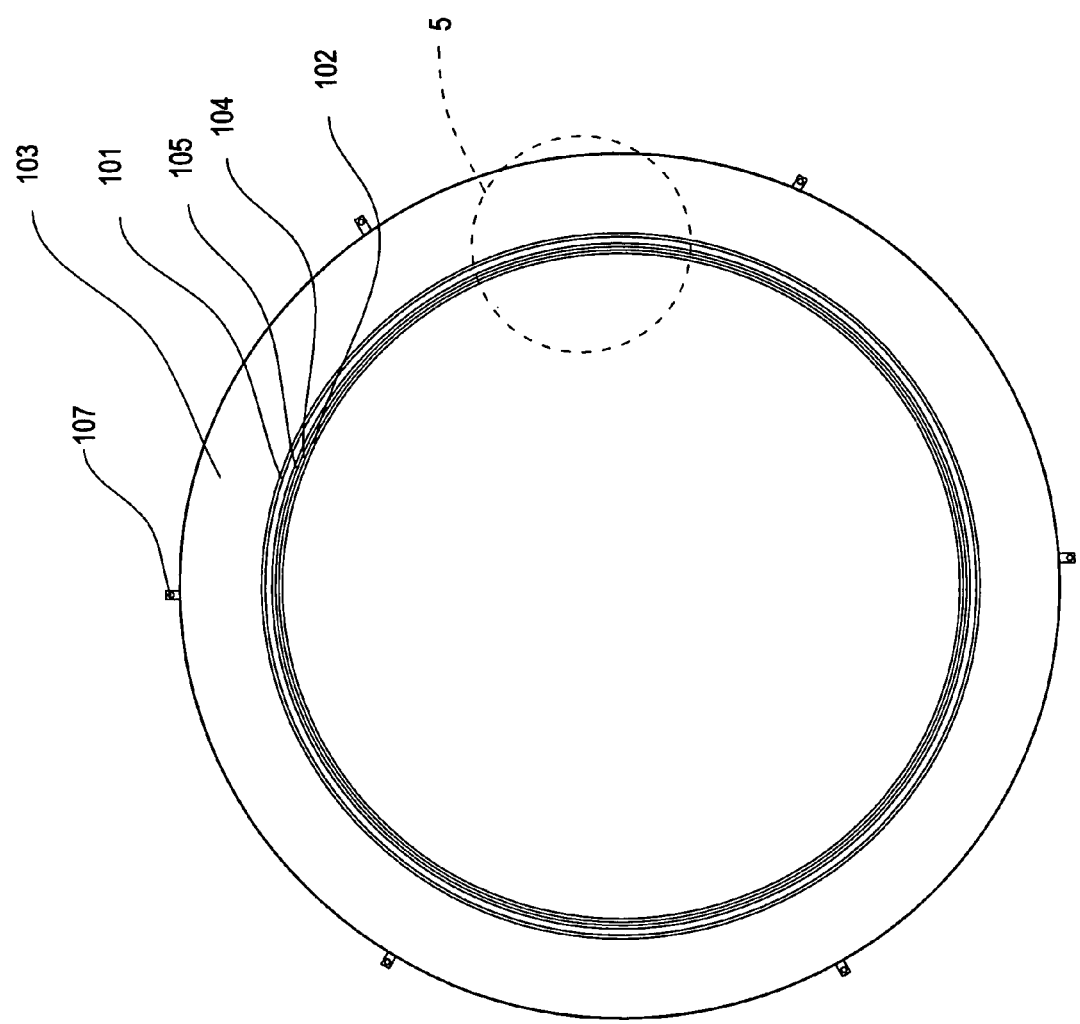
FIG. 4 illustrates a top view of one module.
Figure 5:
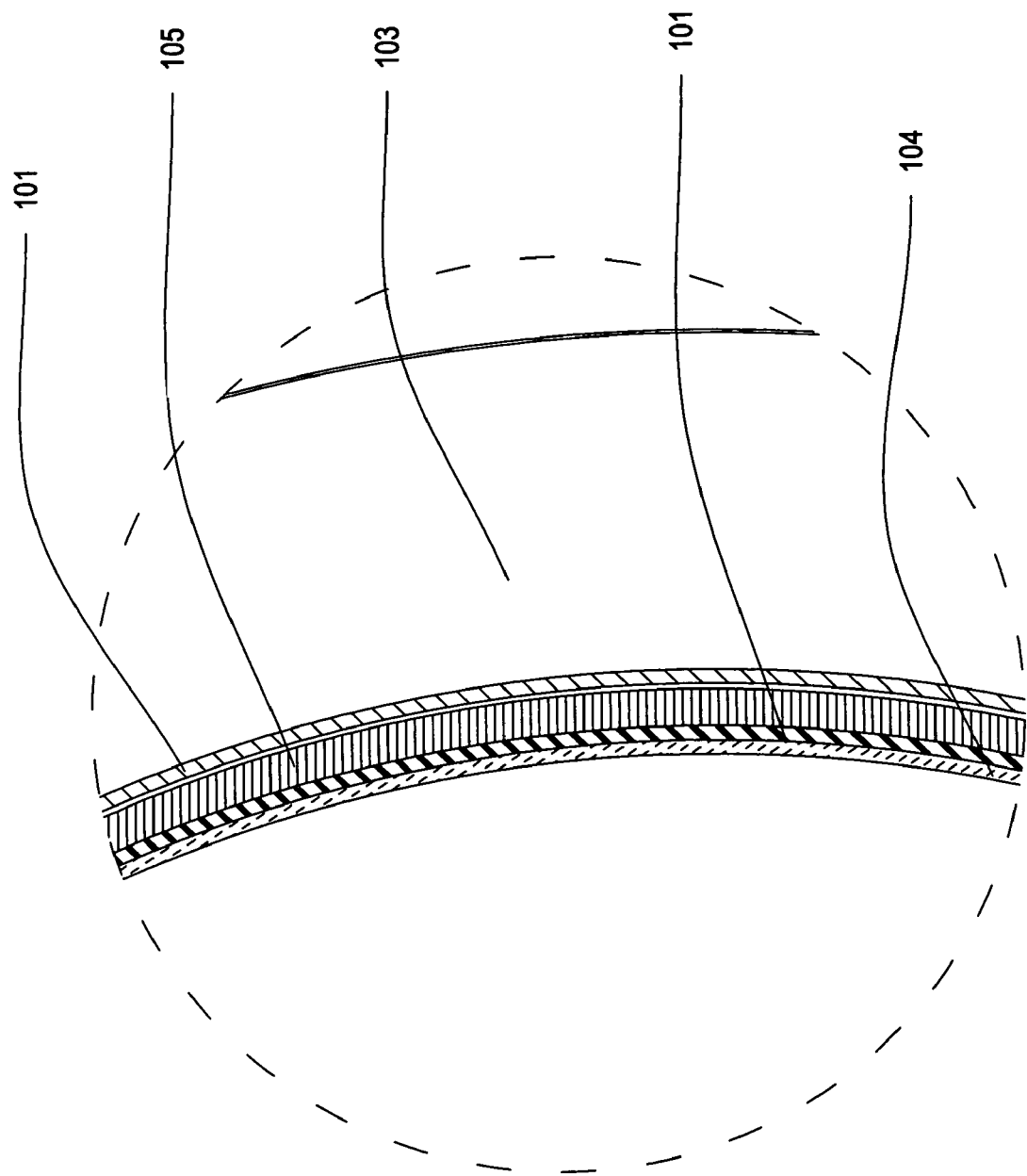
FIG. 5 illustrates a detailed view taken along dashed line 5 in FIG. 4.

FIG. 2 shows a cross sectional view along line 2-2 of FIG. 1 of one of the OTECWP modular segments 100 of the preferred embodiment, presenting details not shown before consisting of a seal in the form of a wide "O" ring 104, a conical seal 105, the collar 106 formed at the union of the upper pipe segment 101 and lower pipe segment 102 and cable guides 107 which will be placed interspaced in radial fashion at the outside of the floater 103. FIG. 3 presents details of the intersection of the two pipe segments. The difference in diameter or axial dimension with respect to the horizon combined with the length of the upper pipe segment will define the degree of bending allowed between two consecutive modules. The conical seal 105 of the preferred embodiment or 105a of an alternative embodiment could be made of semi-rigid foam or a plastic or elastomer to cushion and dampen some of the movements of the OTECWP, yet allowing the OTECWP to flex slightly with the movement of the platform or undersea currents.

Figure 6:
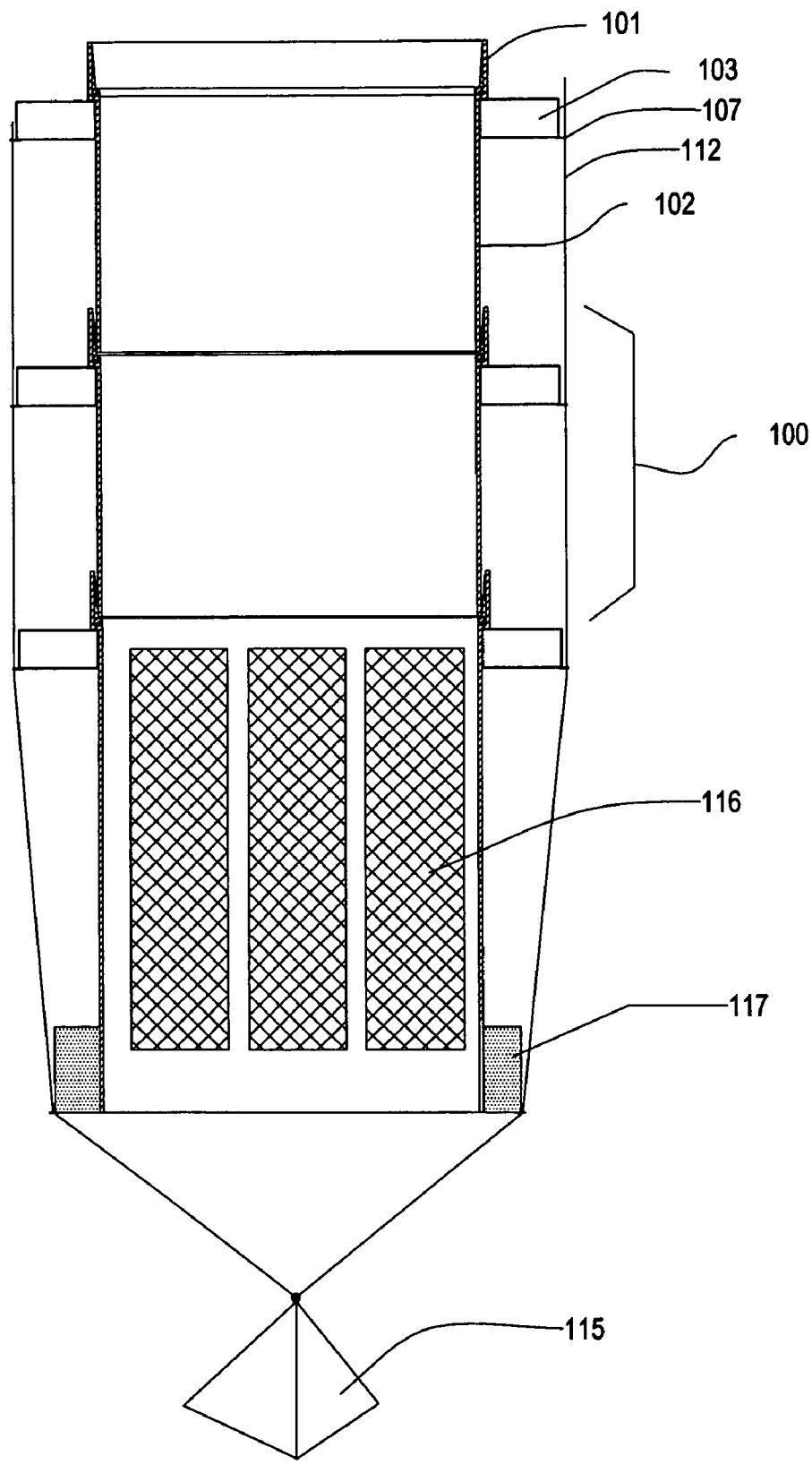
FIG. 6 illustrates the three lower modules assembled together.
Figure 7:
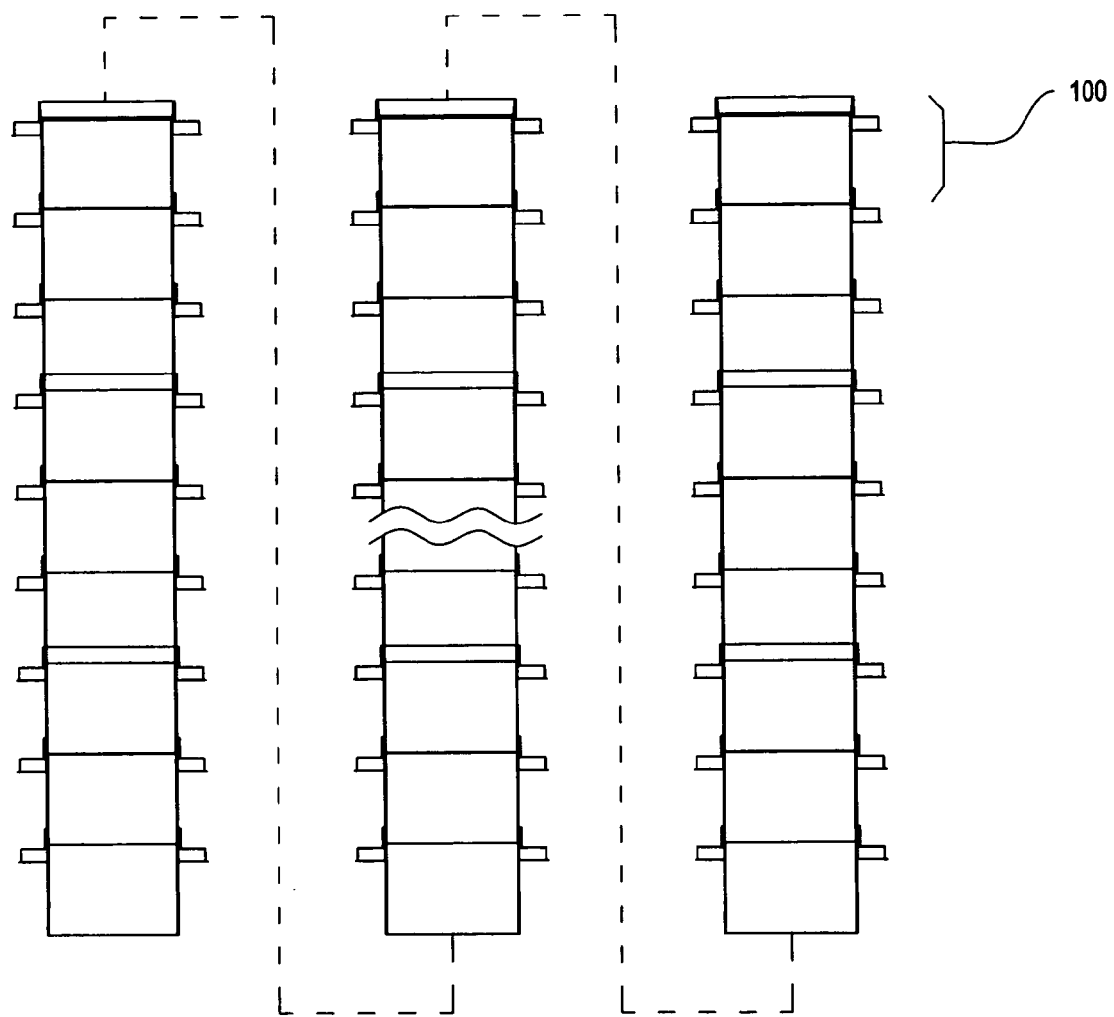
FIG. 7 illustrates a long OTECWP assembled together with a plurality of modules.

FIG. 6 shows a cross section view, across an extended line 2-2 of FIG. 1, of the three lower segments of the OTECWP used to create the CWP, showing how the modules insert together one on top of the other, coupling the upper pipe segment 101 of the lower module with the lower pipe segment 102 of the segment just above it. FIG. 6 also shows how the cable 112, attached to the cabling guides 107 connects to a weight or anchor 115 to maintain the OTECWP vertical despite undersea currents, a mesh screen 116 used to prevent debris or fauna from entering the pipe and an annular reinforcing ring 107 which could be used as anchor in the shorter OTECWPs. FIG. 7 shows an assembled long OTECWP with a plurality of modules.

The individually constructed modules could be tied together and then towed to the site where with the aid of a crane, one module could be lifted and placed on top of another receiving module, connecting the lower vertical segment 102 with the wider vertical tube segment 103. The additional weight will submerge the bottom segment. The operation will be repeated with multiple modules to reach the desired depth. As an alternative construction method, the weight or anchor can be used to lower slightly the segment of the OTECWP being assembled by temporarily tying the guiding cable to the cabling guide hooks 107 of the upper module allowing the pipe to sink so that the next module could be slid on top of the semi-submerged pipe. After the module is in place, the submerged pipe could be lifted to engage with the module on top. The operation will be repeated until the complete pipe is assembled. To counteract the influence of submarine currents pushing the OTECWP past the contact angle and separate, the modules would be connected via guiding cables 112 that will be supporting a weight or an anchor 115 at the lower portion of the OTECWP. The guiding cables would be fastened to the platform. Although placing an anchor negates somehow the effect of the buoyancy, the weight of the anchor is only a portion of the weight of the OETCWP. Furthermore, such weight or anchor would permit the OTECWP to be lowered, disconnecting it from the platform, in the event of a threatening storm, allowing the platform and the OTECWP to ride the storm independently.

The length of the segments could be different for each OTECWP and even for a particular pipe, depending on the desired rigidity or flexibility to accommodate varying intensity of movement or undersea currents, or the convenience of reducing obstruction of the floaters to the flow rate. The size of the floater (the displaced volume) will have to be adjusted to provide the desired floatation to each individual segment. Obviously, similar segments would have similar floaters.

The buoyancy provided by the displaced volume of the annular floater of each individual module in the embodiments could be adjusted during assembly by providing, in some or all individual modules, with the possibility of allowing water in and out of the floater by a combination of valves (not shown) to act as ballast. Injecting or expulsing water could be done by pumps or compressors or some other means of adding or removing water to achieve the desired buoyancy and prevent the whole embodiments from exerting a strong positive pressure on the platform. A mechanism for continuously adjusting the buoyancy is not required.

Alternative Embodiment

Figure 8:
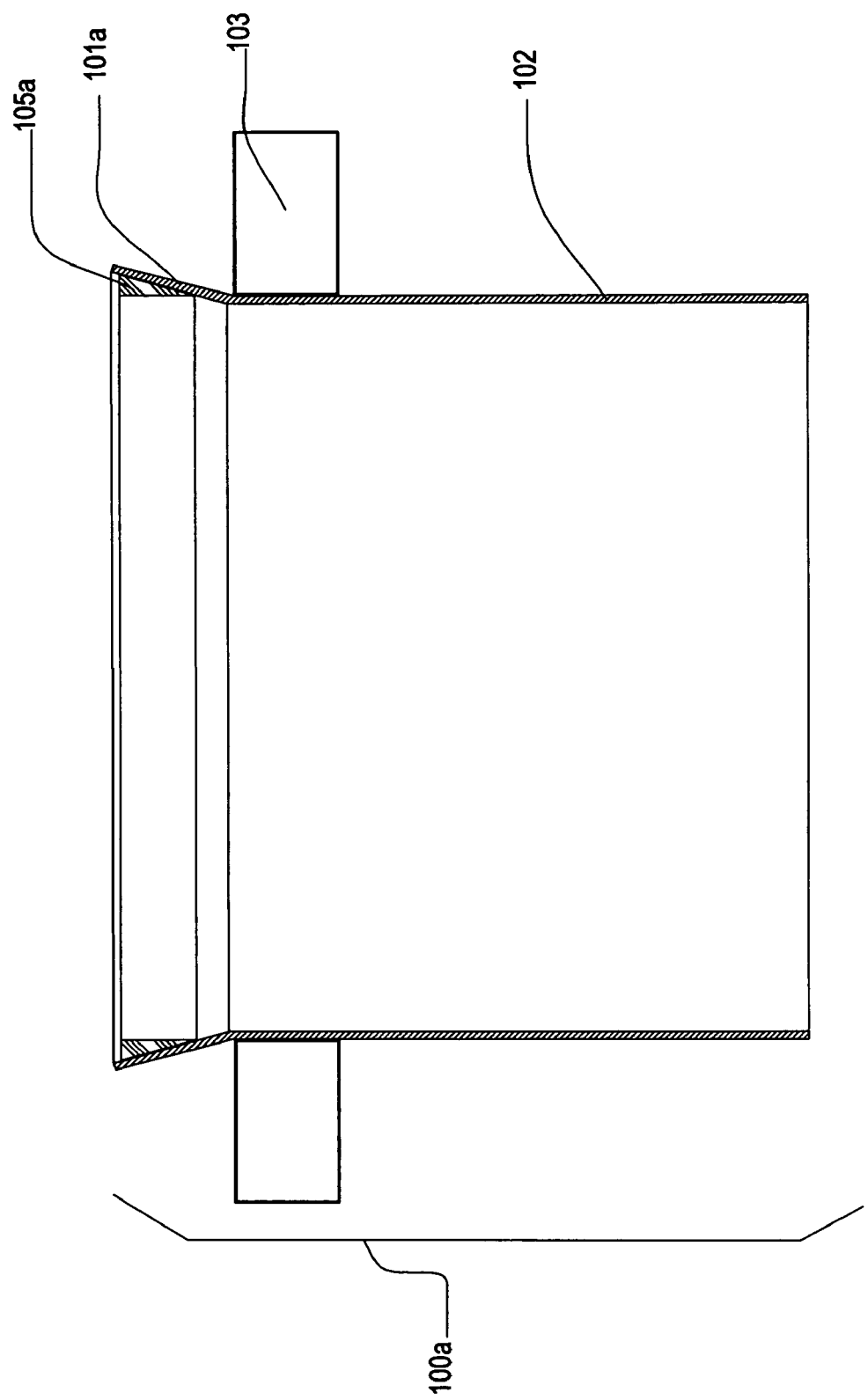
FIG. 8 illustrates a cross section view of one module of an alternative embodiment.

FIG. 8 shows an alternative to the preferred embodiment, constructing the upper pipe segment 101a at a slightly inclined angle forming a conical opening to receive the lower pipe segment 102 of the new module that will be placed above it. A different conical seal 105a will also dampen the movements of the OTECWP.

Additional Embodiments

The same invention can be used to construct the DWP and the SWP, if needed. As a further extension to the preferred embodiment, the CWP and DWP could be placed in a concentric arrangement, with the DWP placed as the outer pipe, providing additional protection to the CWP. If so desired, the concentric arrangement could also incorporate the SWP, placed outside the DWP. The diameter of each pipe in a concentric placement will depend on the size of the OTEC plant and the desired flow rates, with the flow area available to the outside pipes calculated based on the annular area.

Figure 9:
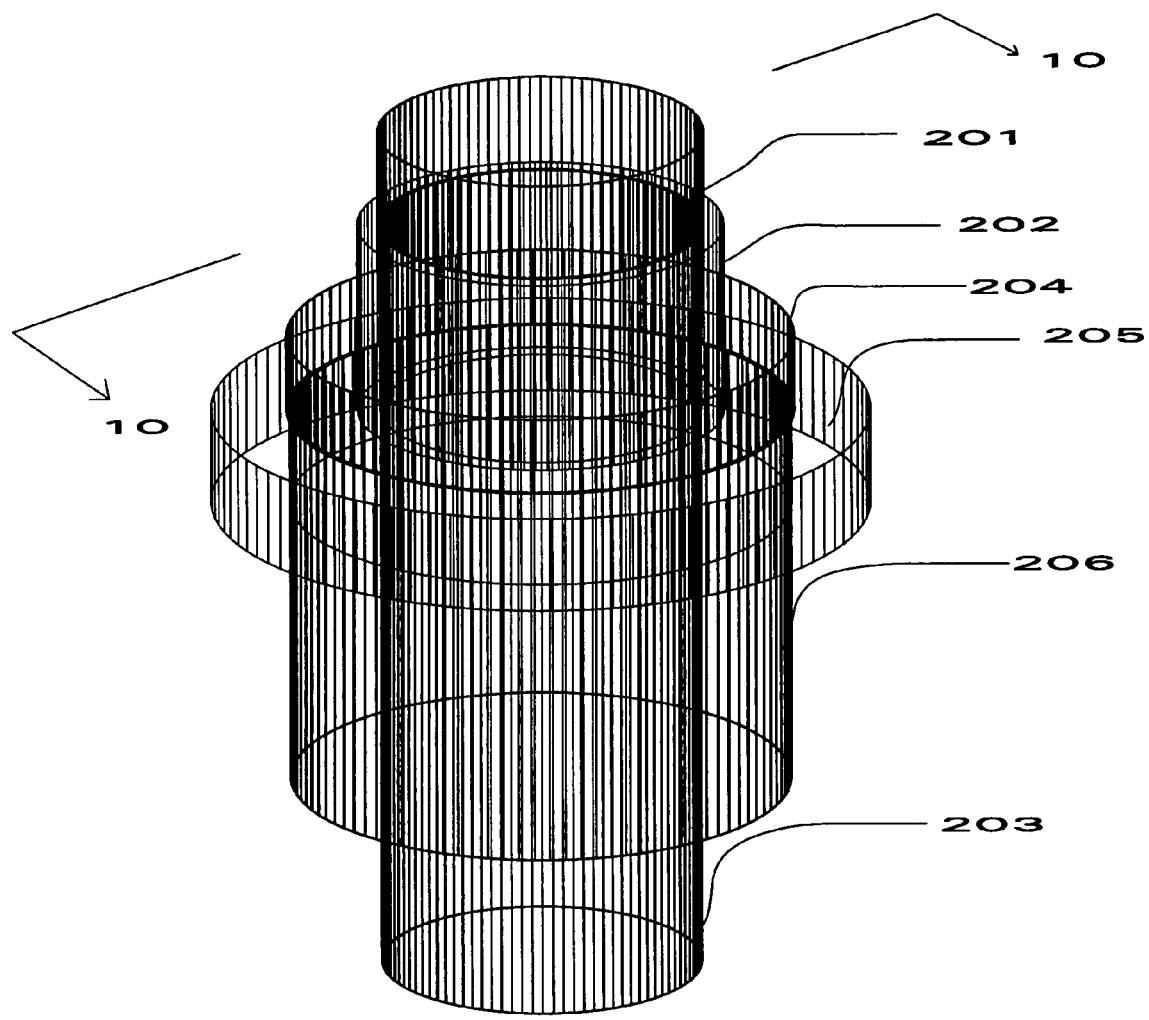
FIG. 9 illustrates an isometric view of two concentrically placed OTECWPs comprising one smaller module of the preferred embodiment inside a larger diameter module.
Figure 10:
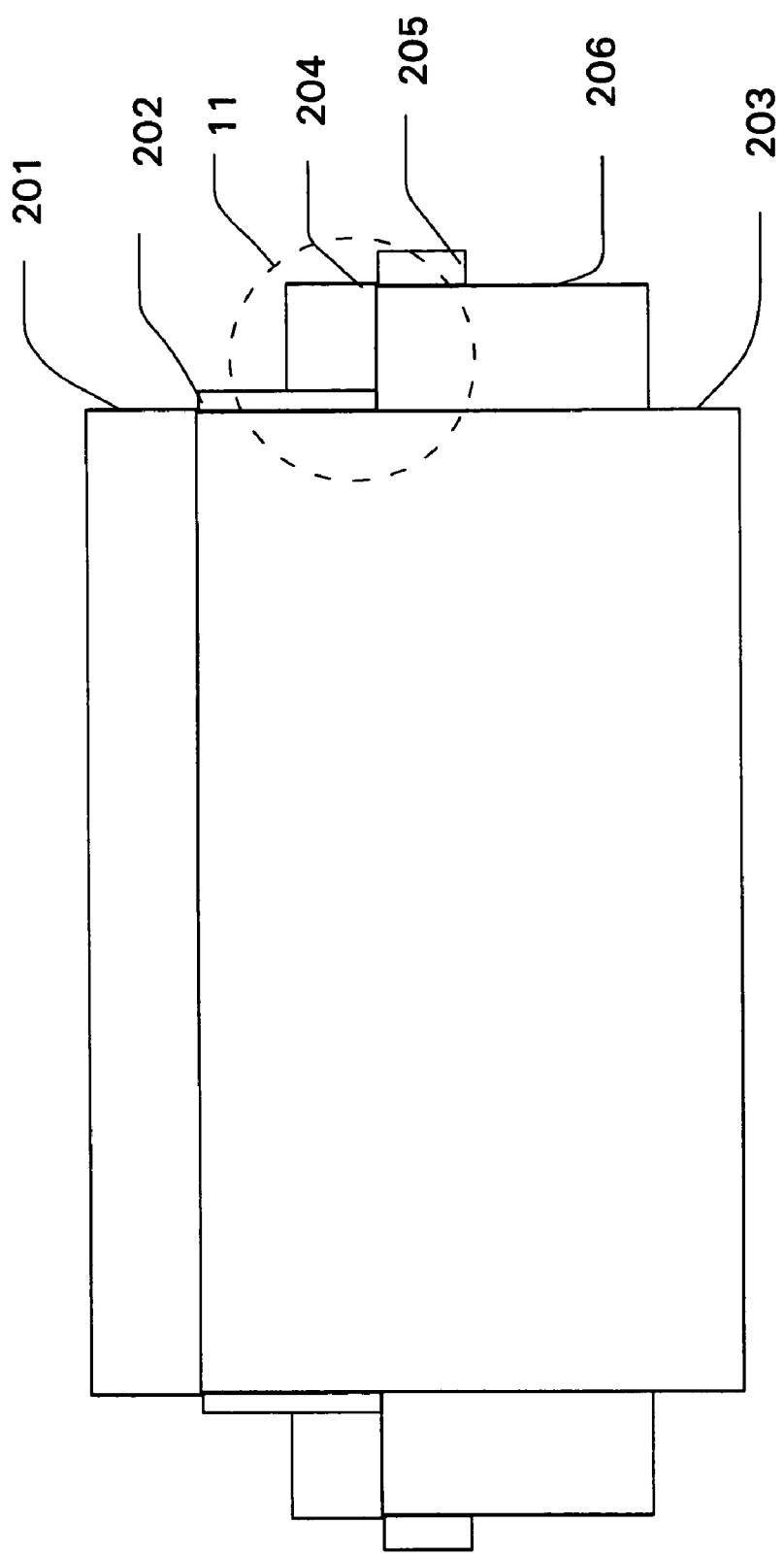
FIG. 10 illustrates a cross view taken along line 10-10 in FIG. 9 of the two concentric modules.
Figure 11:
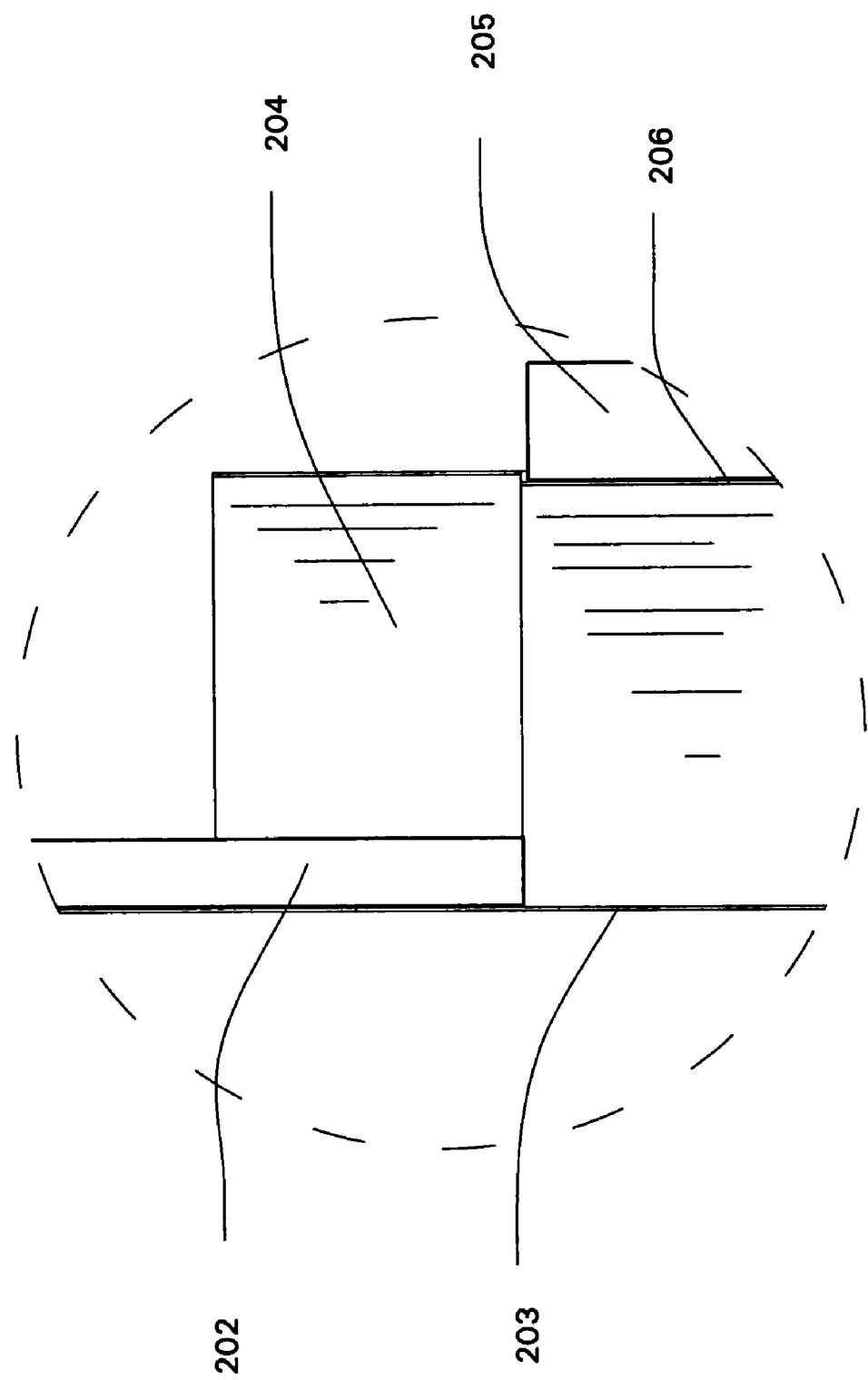
FIG. 11 illustrates a detailed view along the dashed line in FIG. 10 of the two concentric modules.

FIGS. 9, 10 and 11 show different views of a preferred embodiment for placing two such pipes (likely the DWP and CWP) in a concentric arrangement. The same methodology could be used for the three OTECWP, namely the SWP, the DWP and the CWP in a concentric arrangement (not shown). FIG. 9 shows an isometric view; FIG. 10 shows a cross section view along line 10-10 and FIG. 11 shows a detailed view along dashed line 11 around the collars of the two concentric OTECWPs. The outside OTECWP will be the shortest and bulkiest. The upper floater of the outside OTECWP could be shaped with an outward curvature (not shown) to act as a pseudo keel, to dampen the movement of the OTECWP and the platform. The inner pipe will be the CWP. The dimensions of the inner floaters of the CWP, while inside the concentric arrangement with the outer OTECWP will be optimized to produce the desired displacement volume with minimal obstruction to the water flow of the outer OTECWP. Once the CWP is outside the outer OTECWP, the dimensions of the floaters would be optimized to produce the maximum volume of displacement with the smallest volume of the material needed to construct the annular floater to reduce costs.

As another alternative to the preferred embodiment, the OTECWPs and their corresponding floaters could be constructed in an elliptical or oval shape to offer lesser resistance to surface or submarine currents. Furthermore, there is no limitation of mixing different shapes, with the outer OTECWP taking the shape of the hull of the platform, an elliptic upper segment of the middle OETCWP and a circular inner OTECWP.

CONCLUSIONS, RAMIFICATIONS AND SCOPE

The above invention presents a simple way of constructing a large diameter pipe and a method to easily construct the OTECWP, providing for flexibility along all the total length of the pipe, releasing the stress of the OTECWP caused by the inertia to move against the constantly moving platform.

The present invention would allow the platform and OTECWP to be disengaged if a storm is threatening the area, allowing the platform and the OTECWP to ride the storm independently.

The modular construction allows for having spare parts and thus quick and easy repair of the OTECWP in the event that one unit is damaged.

The total weight of the OTECWP could be limited to the weight of the anchor needed to assure the OTECWP are vertical, thus limiting the support required.

The invention claimed is:

1. A modular vertical floating pipe, forming the cold water pipe of an ocean thermal energy conversion plant, having a diameter of more than 10 m and reaching depths of about 1,000 m, comprising:
A) a plurality of pipe segments constructed from a group of materials consisting of concrete, steel, or other suitable material capable of operating in the marine environment for many years, with each said pipe segment having:
1) a longer and lower vertical section;
2) a shorter and upper section, either:
i) vertical but with a slightly wider aperture than said lower vertical section; or
ii) a slightly inclined segment, therefore gradually increasing the aperture with respect to said lower vertical section;

B) an annular floater, having such predetermined dimensions to provide buoyancy to support the weight of the pipe segment and the floater and constructed either as a single ring, or, forming a ring by attaching together a plurality of arcuate segments, of such dimensions that would allow them to slide along the lower vertical section of the pipe segments and constructed from a group of materials consisting of plastic, cement or steel;

C) means of attaching or tying contiguous pipe segments or floaters which could be used as means of supporting a weight to maintain the modular vertical floating pipe in a vertical position or as means of lowering the modular vertical floating pipe;

D) means of sealing the connection between two pipe segments;

whereby, by inserting the lower portion of one of said pipe segment into the upper portion of another pipe segment, a longer vertical pipe could be formed;

whereby, by using as many pipe segments as needed, said longer vertical pipe could reach the desired depth;

whereby, the upper pipe segment of the modular vertical floating pipe is attached to a floating platform, while the lower pipe segment is floating at the desired depth, above the ocean floor.

2. Several modular floating pipes of claim 1, of different diameter and length, preferably in a concentric arrangement would provide for the surface water, the discharge water and the cold water pipe for an ocean thermal energy conversion plant.

3. A process to build a modular vertical floating pipe, consisting of the following steps:

A) On a dry-dock of a shipyard:

(1) Providing for a pipe segment, placed vertically, having: (i) a longer and lower vertical portion and (ii) a shorter upper portion, either with a slightly wider aperture than the lower section or a slightly inclined segment that gradually increases the aperture of the upper section;

(2) Providing for a floater of such dimensions that it is able to slide unimpeded in the lower portion of said pipe segment;

(3) Joining the floater and the pipe segment, either by inserting the lower vertical segment into the opening of the floater or by joining segments of the floater around the lower vertical portion of said pipe segment;

(4) Allowing water to enter the dry dock where said pipe segment and the floater, forming a module of the vertical floating pipe therein constructed or assembled, are floated;

(5) Towing the module of the vertical floating pipe outside the shipyard, tying it onto a buoy;

(6) Repeating operations (1) to (5) until all modules have been constructed, whereby, said floaters would have such predetermined dimensions to provide buoyancy to support the weight of the pipe segment and the floater, whereby, said floater would slide up the lower vertical portion of the pipe segment and will lift all the pipe segment, whereby, means of adjusting the buoyancy of the floaters will be incorporated into the floaters, whereby, the process described above could be modified to construct horizontal pipe segments and allowed to float with the aid of a provisional floater that could be removed, once the pipe segment has been towed to an area with sufficient depth, forming a modular vertical segment, B) At the site:

(1) Providing means of securing either the floaters or a weight or anchor to one or more modules of the said vertical floating pipe;

(2) Securing one vertical floating pipe segment to the weight or anchor;

(3) Providing means of sealing the connection between the lower vertical portion of a module with the upper portion of another segment;

(4) Providing means of dampening the movement of the upper portion of a pipe segment inserted into the lower portion of another module;

(5) Either: (a) lifting one pipe segment and inserting the lower vertical portion of the pipe segment into the opening of the upper portion of another segment, or; (b) lowering the assembled unit to allow a new pipe segment to slide on top of the assembled unit and then raising the assembled unit until contact is made;

(6) Repeating steps (2) to (5) until all modules have been used or the desired depth has been reached;

whereby, by inserting the lower portion of one of said pipe segments into the upper portion of another pipe segment, a longer vertical pipe could be formed;

whereby, by using the required number of modules of different diameter modules, different pipes could be formed;

whereby, by placing different lengths and diameters of said pipes in a concentric arrangement, each reaching the desired depth, the outer units, consisting of shorter pipes but larger diameter could provide protection to the inner pipes.

* * * * *